United States Patent [19]

Adams et al.

[11] 4,233,909
[45] Nov. 18, 1980

[54] RAILWAY CAR ASSEMBLY COMPOSED OF A SERIES OF ARTICULATELY INTERCONNECTED CARS

[75] Inventors: Michael B. Adams, Western Springs; John A. Angold, Naperville, both of Ill.; Robert B. Morrison; Robert E. Zimmerman, both of Topeka, Kans.

[73] Assignee: Itel Corporation, San Francisco, Calif.

[21] Appl. No.: 890,984

[22] Filed: Mar. 28, 1978

[51] Int. Cl.³ .......................... B61F 1/00; B65D 17/10
[52] U.S. Cl. .......................................... 105/4 R; 410/4
[58] Field of Search .................... 105/4, 368 R, 368 S, 105/4 R; 410/4

[56] References Cited

U.S. PATENT DOCUMENTS

| | | | |
|---|---|---|---|
| 1,599,474 | 9/1926 | Koch | 105/4 R |
| 1,608,665 | 11/1926 | Pehrson | 105/4 R |
| 1,727,711 | 9/1929 | Joy | 105/4 R |
| 2,161,685 | 6/1939 | Schoepf et al. | 105/4 R |
| 2,184,298 | 12/1939 | Groff | 105/4 R |
| 2,489,024 | 11/1949 | Gaynor | 105/4 R |
| 2,851,963 | 9/1958 | Sheehan | 105/4 R |
| 2,971,478 | 2/1961 | Dilworth | 105/4 R |
| 3,143,082 | 8/1964 | Austgen | 105/4 R |
| 3,371,622 | 3/1968 | Lich | 105/4 R |
| 3,509,829 | 5/1970 | Henriksson et al. | 105/4 R |
| 3,521,569 | 7/1970 | Muotka et al. | 105/4 R |
| 3,675,592 | 7/1972 | Bateson et al. | 105/4 R |
| 3,721,199 | 3/1973 | Hassenauer | 105/4 R |
| 4,141,300 | 2/1979 | Marulic et al. | 105/4 R |

FOREIGN PATENT DOCUMENTS 1561318 6/1971 France ..................................... 105/4 R

OTHER PUBLICATIONS

Modern Railroads, Apr. 1962, "Compact" Car Reduces Piggy Cost.

Primary Examiner—Richard A. Bertsch
Attorney, Agent, or Firm—Stevens, Davis, Miller & Mosher

[57] ABSTRACT

A series of relatively lightweight, short, articulately interconnected cars is disclosed for transporting trailers or other cargo containers on a railway. The interior cars of the series include a center sill which constitutes a narrow width underframe and a length substantially equal to the length of a car, a pair of end sills connected perpendicularly to the center sill at opposite ends thereof and having a width extending beyond each side of the center sill, support members interconnecting the ends of the end sills with the center sill, and male and female portions of an articulated connector respectively attached to each end of a car. End cars have one end, constructed similarly, but are provided with conventional semi-automatic couplings on the other end in place of a portion of the articulated connector. The articulated connectors are mounted on a single conventional railway truck which spans the adjacent ends of interconnected cars and further supports the support members. Special configurations of the cars are disclosed for use in a trailer-on-flatcar (TOFC) and container-on-flatcar (COFC) environments.

26 Claims, 30 Drawing Figures

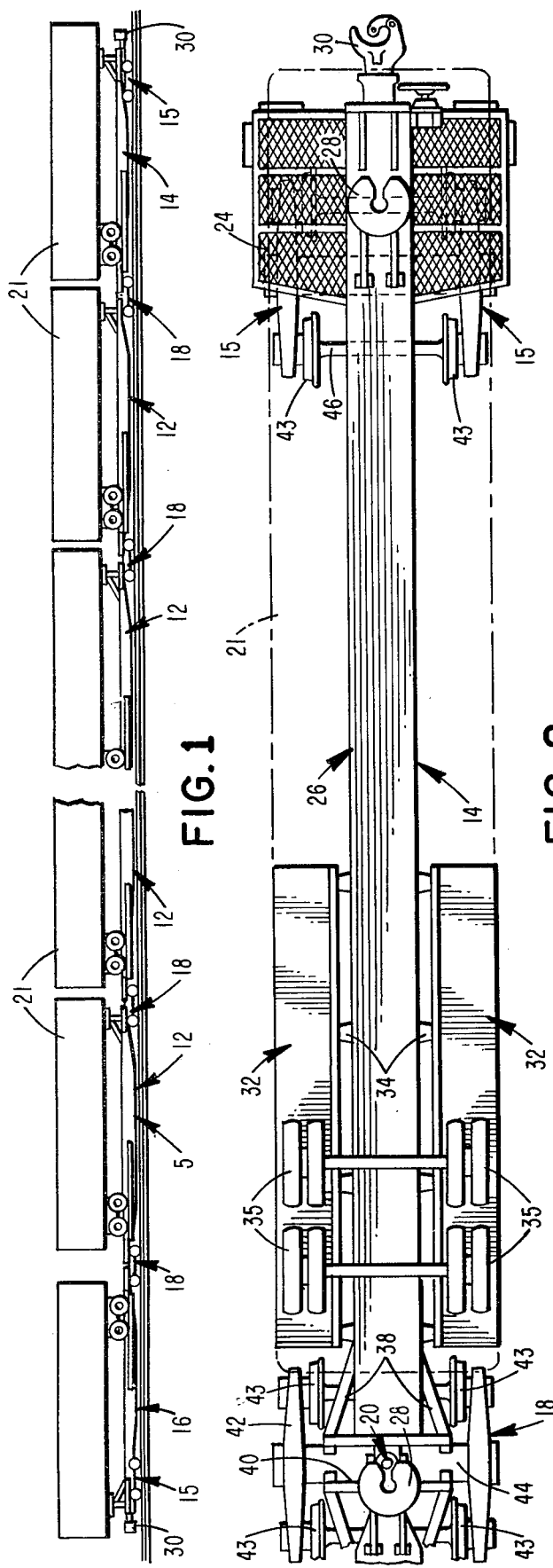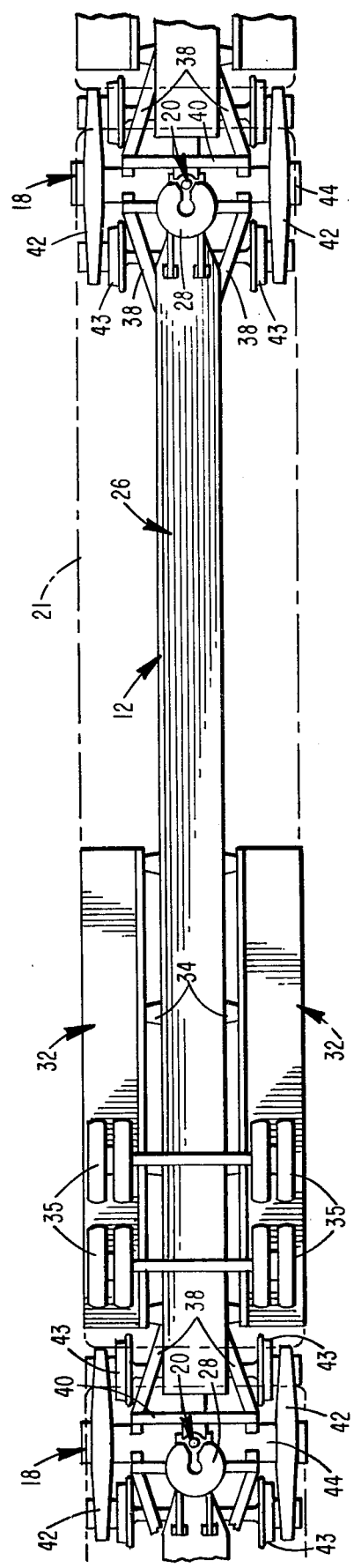

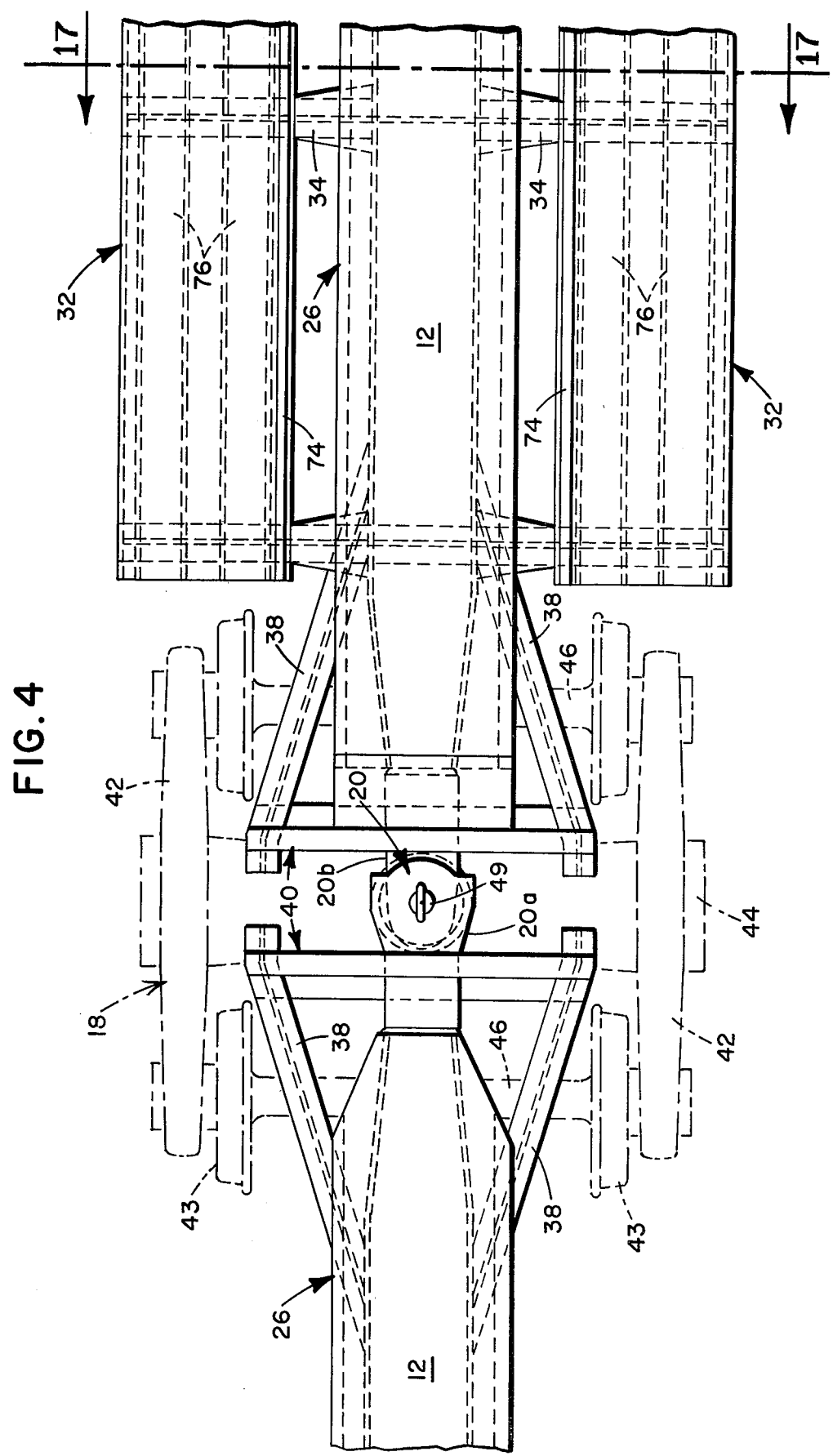

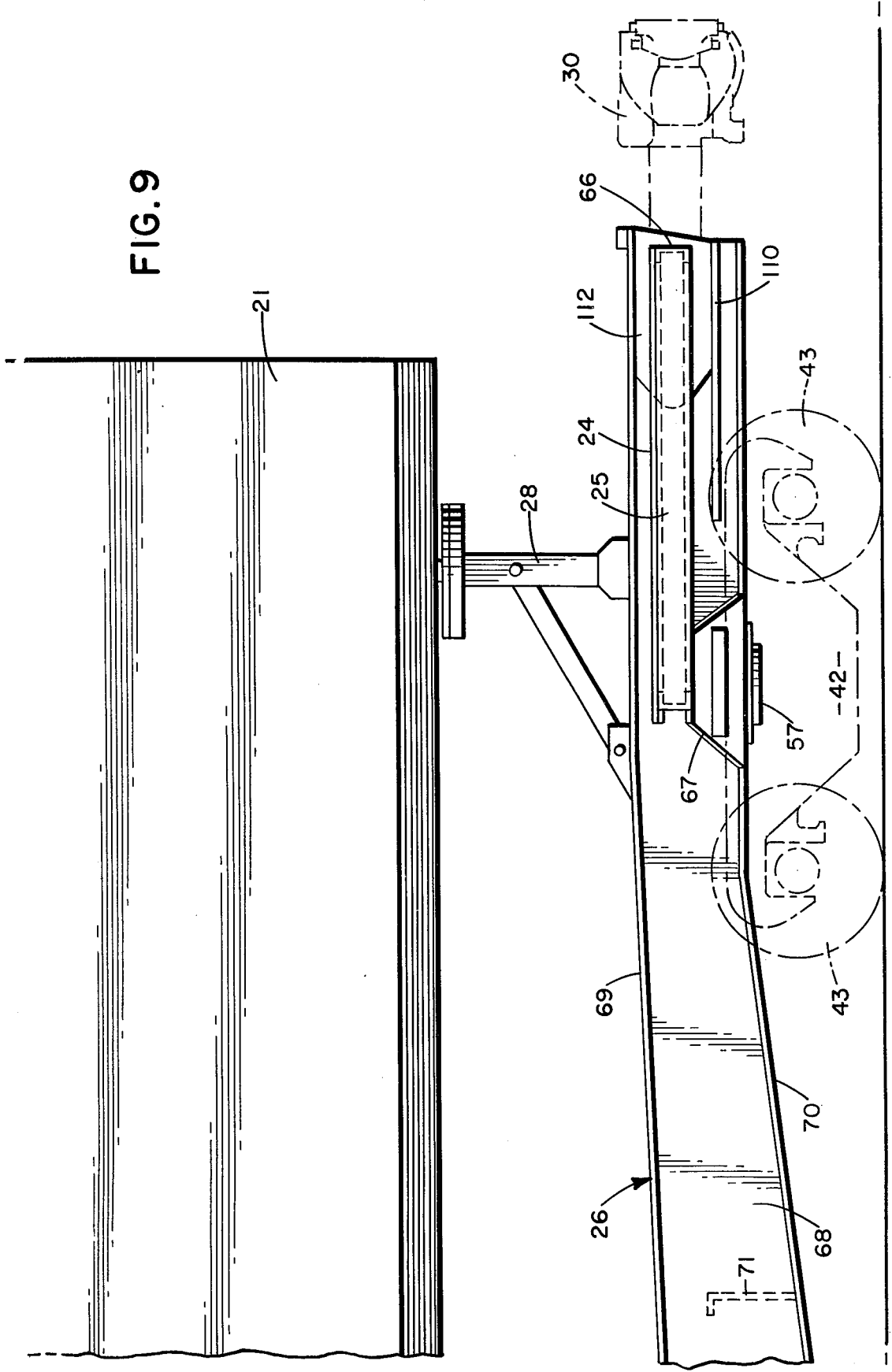

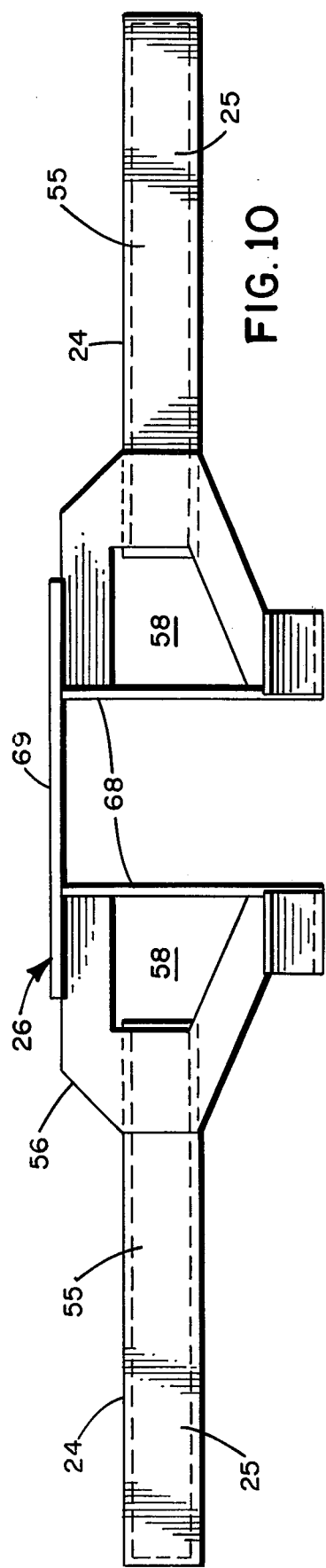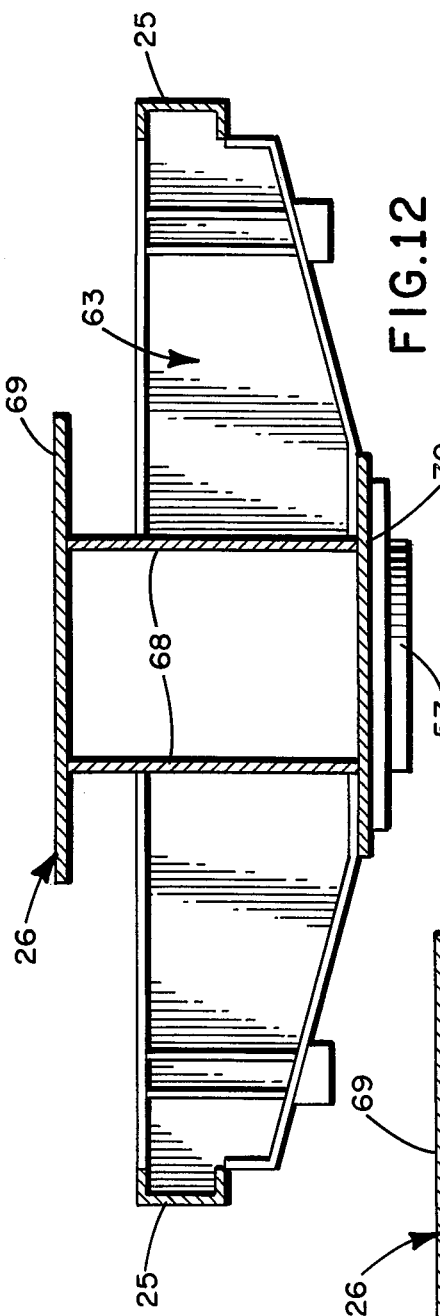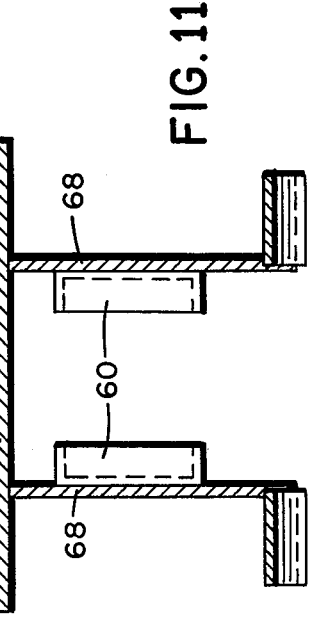

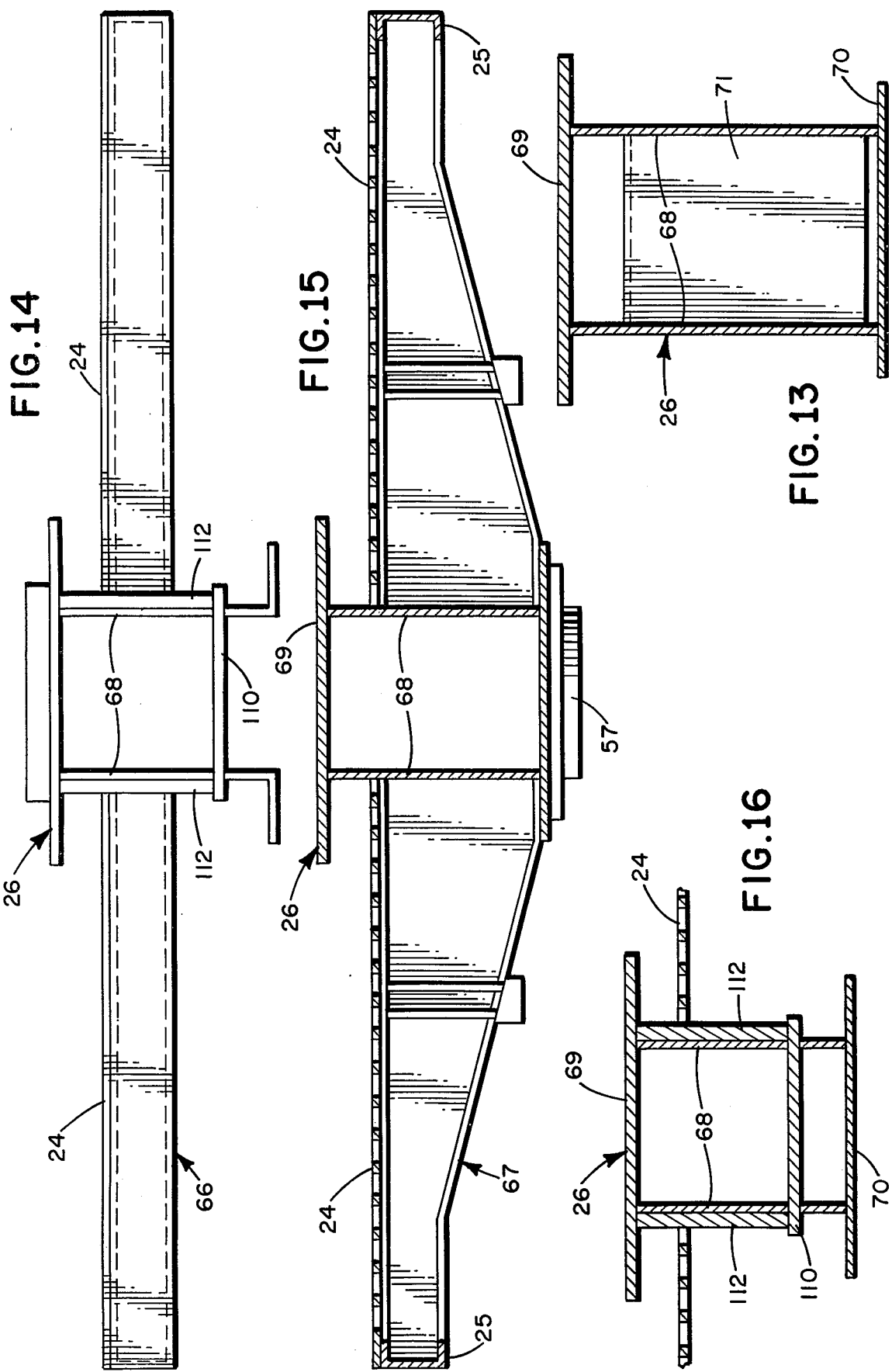

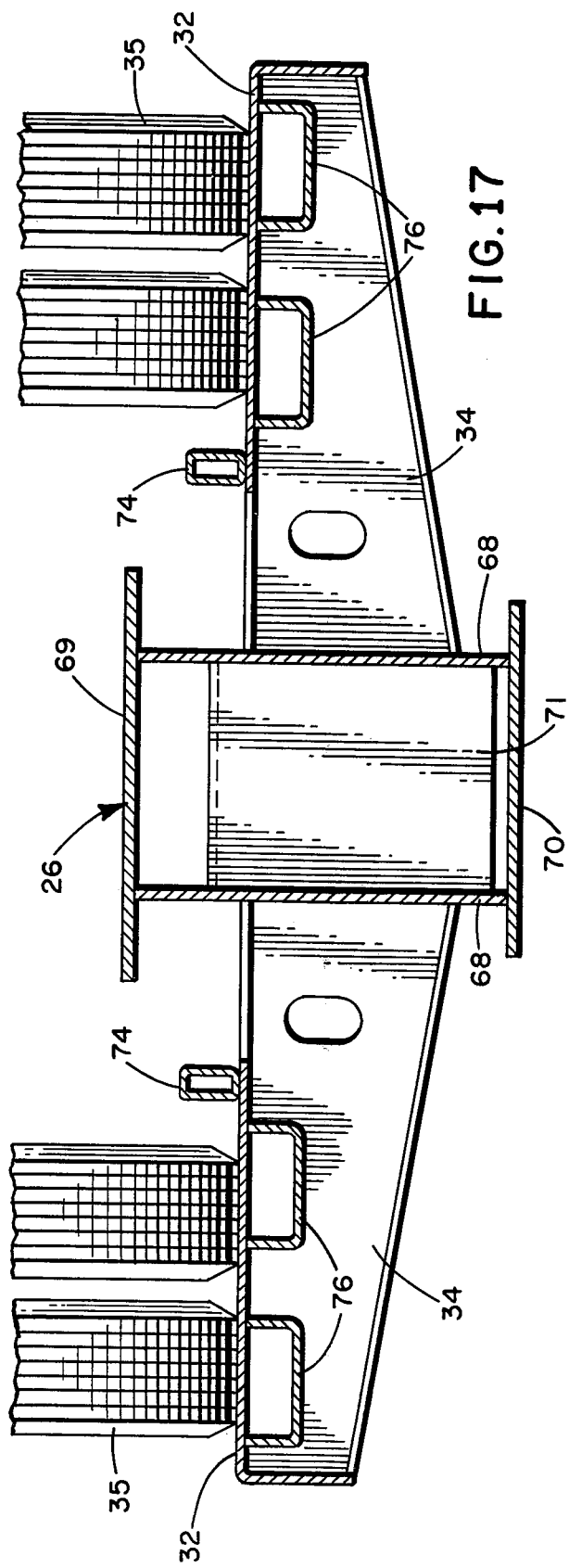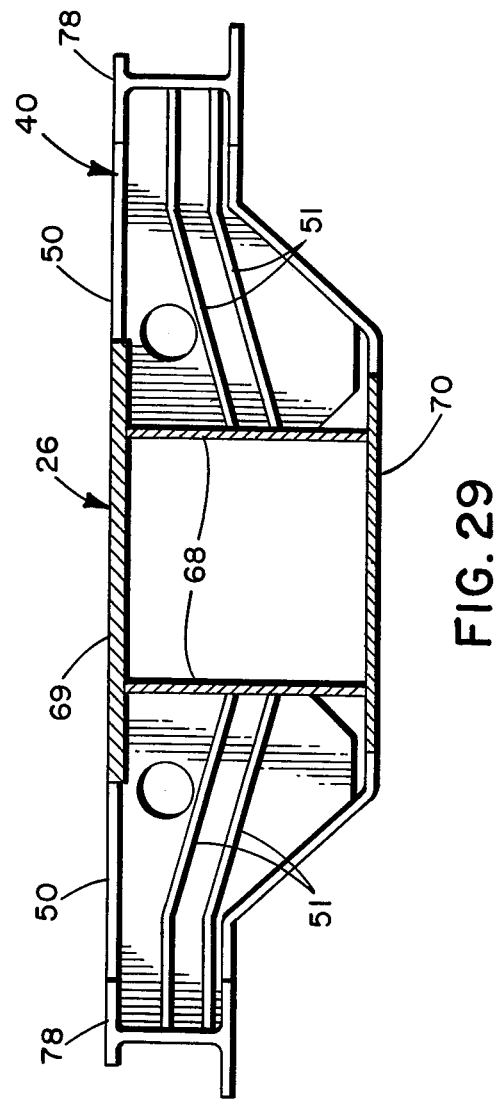

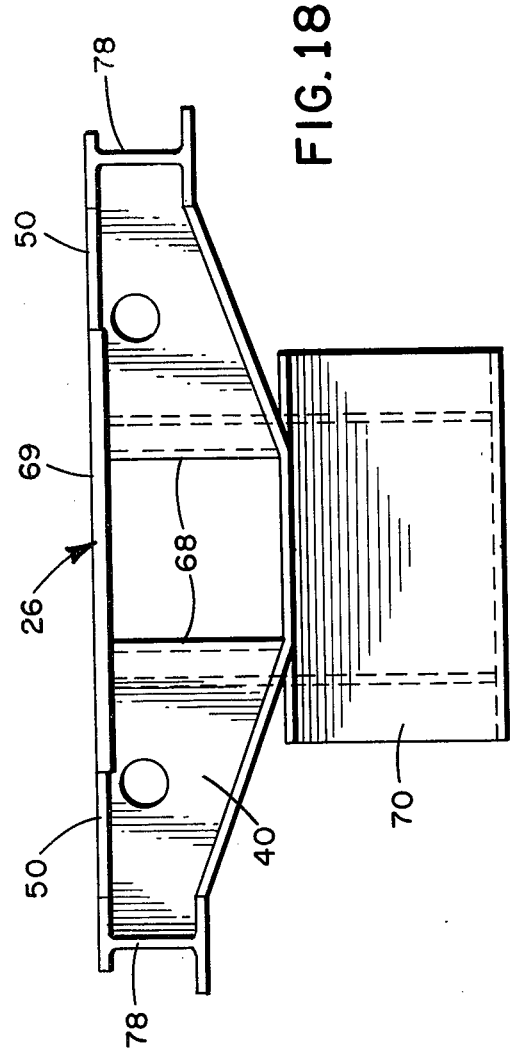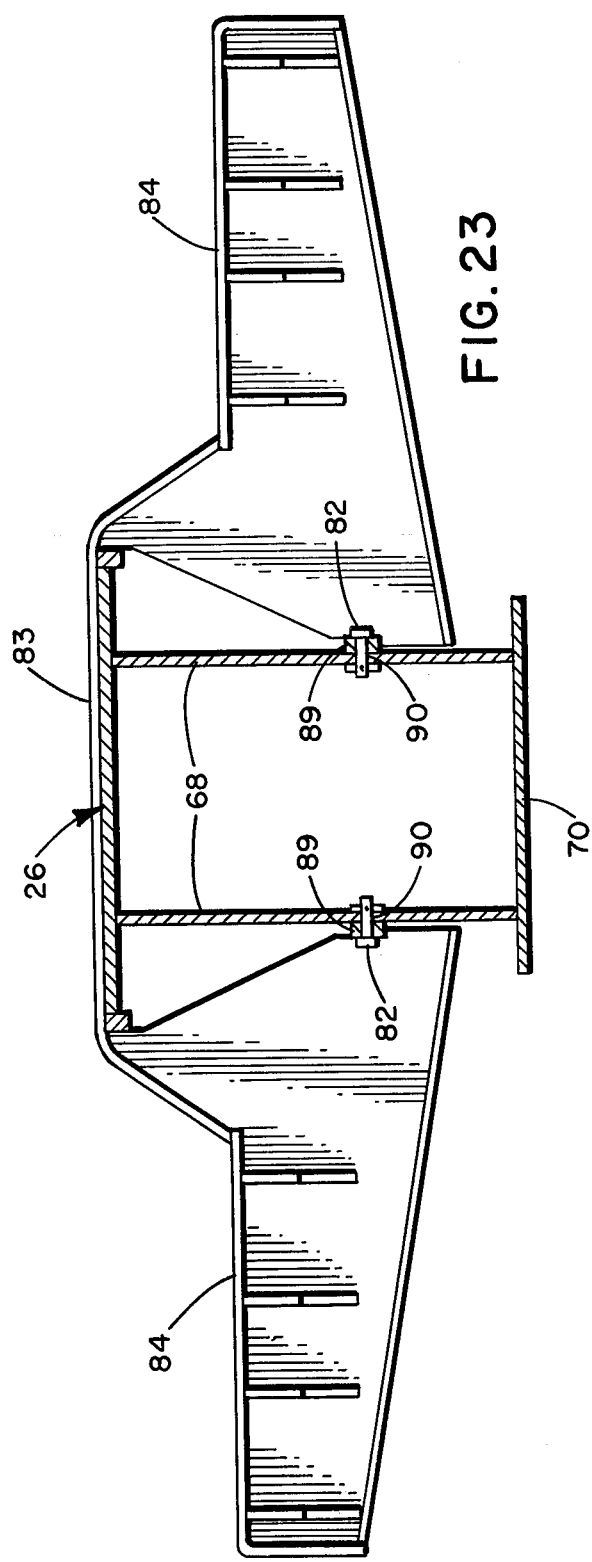

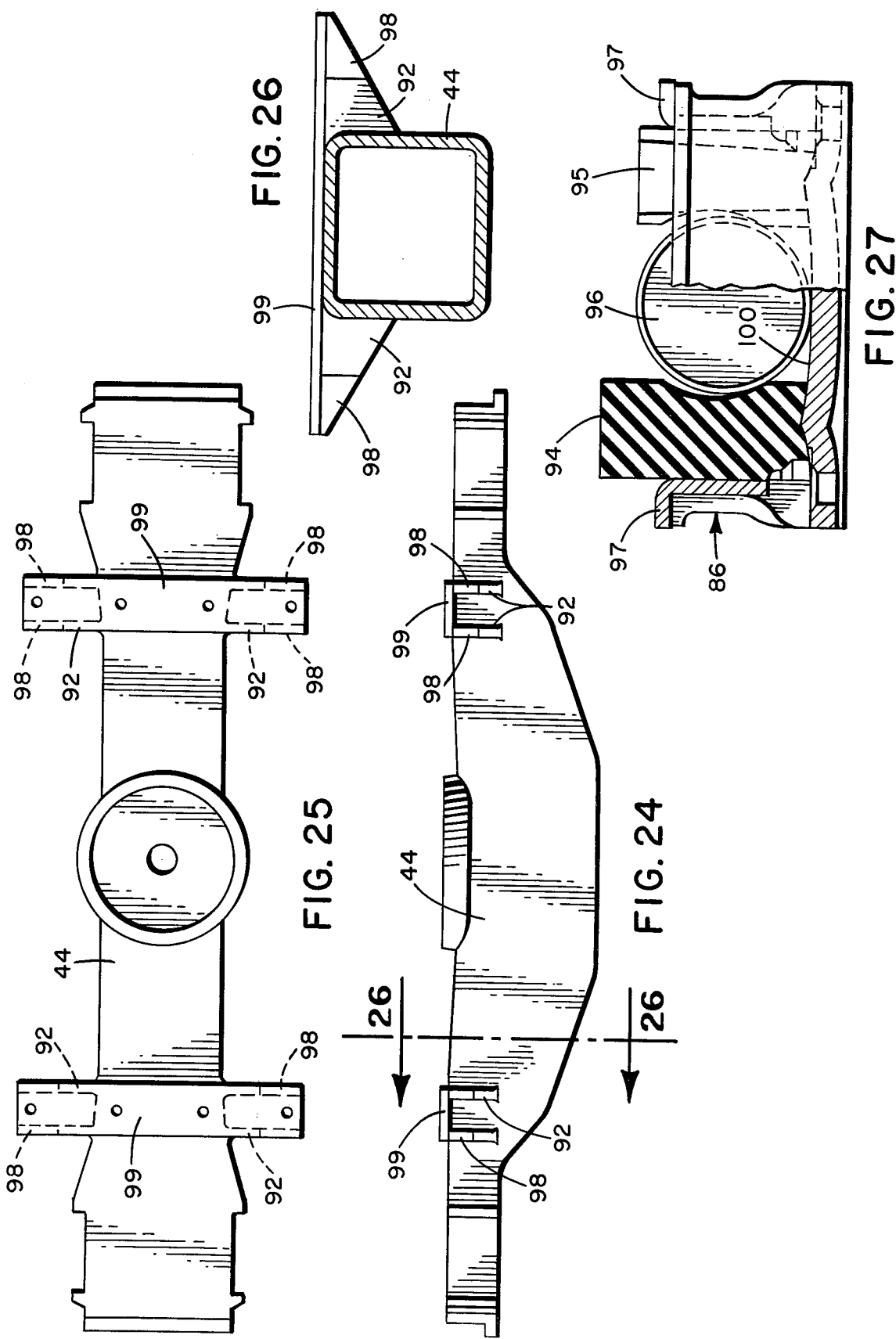

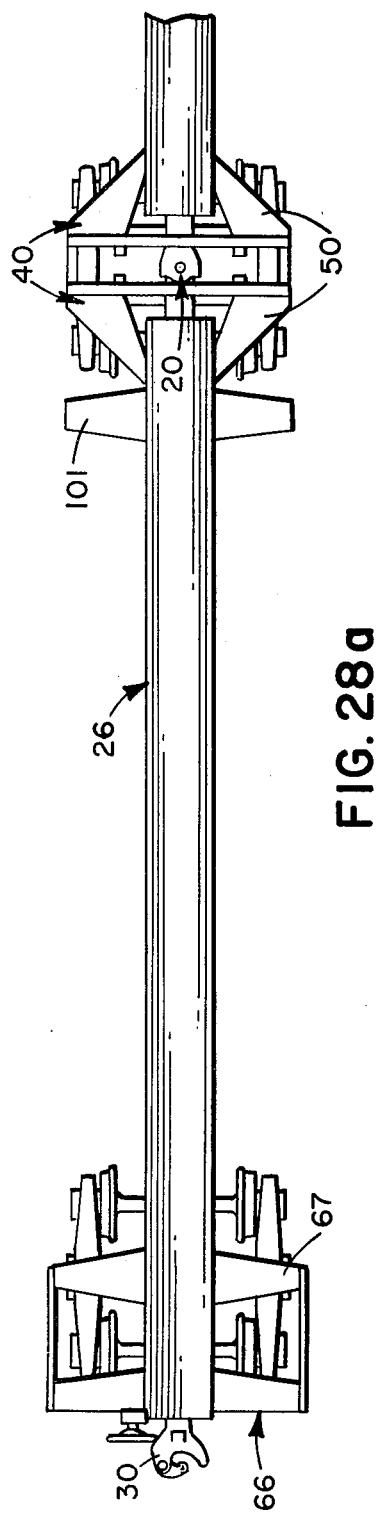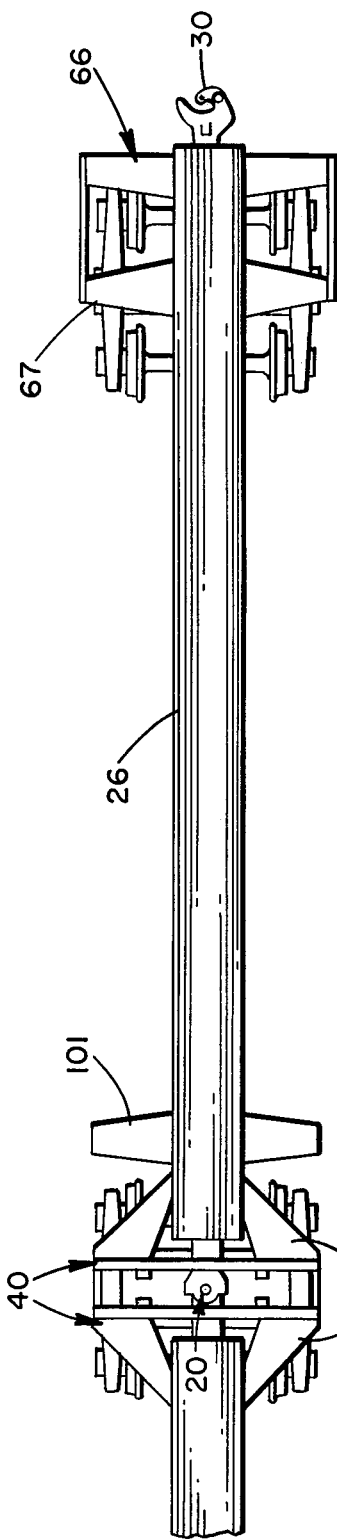
FIG. 28a
FIG. 28b

RAILWAY CAR ASSEMBLY COMPOSED OF A SERIES OF ARTICULATELY INTERCONNECTED CARS

BACKGROUND OF THE INVENTION

The sharply increased cost of locomotive fuel in the past several years has caused increased efforts in the railroad industry to reduce tare weight of rolling stock, since fuel consumption is related to the gross weight of the shipment (train plus cargo). While reduced weight is an important consideration in any type of shipment, it is especially important in piggyback (highway trailer or container carried on a flatcar hereinafter TOFC and COFC, respectively) shipments, where the tare weight of the trailer or container is in addition to the tare weight of the flatcar. This "double tare" weight handicaps the rail mode of transportation in its competitive position, via a vis highway transportation for containerized cargo, even though the latter is generally considered to be less efficient in its use of fuel.

Piggyback traffic is generally carried on flatcars of 85 to 89 feet in length. These cars can readily handle two trailers or containers 40 feet long; however, in recent years, the 45-foot highway trailer has come into popular use and presently constitutes a large percentage of the total production of highway trailers. Obviously, two 45-foot trailers cannot be carried on an 89-foot flatcar, and it often happens that only one 45-foot trailer is carried on an 89-foot car, thereby further reducing the fuel efficiency of the operation.

The construction of longer cars to accommodate two 45-foot trailers or containers to remedy this problem is impossible because the railroad industry through its industry association, the Association of American Railroads (AAR), has placed a length limit of 89 feet, 4 inches on any cars constructed in the future. This length restriction is necessary because of operating problems inherent in long cars having long end overhang (beyond the railway trucks). Typically, the cars tend to pull off curves in conditions of heavy pull and to jack-knife under heavy buff forces. Additionally, the geometry of long cars causes them to track poorly, and with the long end overhang there is a tendency for the air hose connections between cars to separate in operation and cause an emergency application of the train air brakes. Still further, long cars must be made quite heavy in order to support the carried weight which is concentrated at the center of the car where the adjacent ends of the two containers or trailers are supported, thereby adding further construction expense and burdens to the pulling equipment.

Accordingly, one object of the present invention is to improve the efficiency of piggyback equipment by providing a unique railway car assembly having the ability to transport a number of trailers or containers less expensively than heretofore possible.

Another object of the invention is to provide railway car assembly which may economically and easily carry variously sized trailers or containers.

Another object of the invention is to provide a railway car assembly having improved overall operating characteristics.

Another object of the invention is to provide a more streamlined piggyback railway car assembly which reduces potential lading damage and pilferage.

Still further, another object of the invention is to provide a basic railway car which is less expensive to build, less costly to maintain and will cost less to operate.

SUMMARY OF THE INVENTION

These and other objects are achieved by a railway car assembly which comprises a series of specially designed short skeleton cars semi-permanently connected with an articulated connector. The articulated connector has a male portion attached to one end of the individual car units, which mates with a female portion attached to the end of an adjacent car unit. The female portion of the connector also has a male center plate cast integrally therewith which mates into the center bowl of a conventional freight car truck bolster, through which the car weight is carried into the car truck. The car truck is located so as to span adjacent ends of the interconnected cars, i.e., is common to two cars.

The outer end of the outer car units in the series is carried by a single axle or conventional twin axle truck in a similar manner to conventional rail freight equipment. A conventional freight car semi-automatic coupler is used at the outer ends of the end car units for interconnecting the series of cars with conventional railway equipment, and conventional or end-of-car cushioning devices may be used in combination therewith.

Any number of individual car units may be semi-permanently connected together, although a practical limit for reasons of maintenance, truck capacity, etc., is of the order of six to twelve individual car units per semi-permanently connected section of cars.

Individual car units are constructed with a center sill extending substantially the entire length of a car. Opposite ends of the center sill are attached to respective end sills perpendicularly disposed to the center sill, the end sills having a width extending symmetrically beyond either side of the center sill. Support elements such as arms or gussets interconnect the ends of the end sills with the center sill. The support elements are designed to rest on support bearings affixed to the specially modified bolster of a common truck interconnecting two adjacent car units or to support bearings affixed to the end truck in the case of an end car unit.

The individual articulated car units are just over the length of a typical carried trailer or container, e.g., 40 feet or 45 feet. As a result, the weight of the piggyback shipment is concentrated over the railway trucks at the ends of the cars, thus obviating the need for a heavy underframe to support the vertical load and considerably reducing car weight. Cars of differing length, e.g., 40 feet or 45 feet, can be mixed together in the railway car assembly. Further, by doing away with the conventional car deck and merely supplying a short platform at one end of the car units to carry the trailer bogie in a trailer-on-flat-car (TOFC) use or by affixing transverse bolsters to support the container ends in a container-on-flatcar (COFC) use, additional weight is eliminated. An adjustable saddle type platform for carrying a trailer bogie may also be substituted for a fixed platform to accommodate trailers of varying lengths.

Conventional cushioning devices such as pneumatic cushions or draft gears are eliminated at the articulated connections, and the so-called low-deck (28" diameter wheel) freight-car truck is used to further reduce car height and weight.

When the cars are adapted to handle trailer shipments, i.e., TOFC environment, the conventional trailer hitch is placed as near to the end of the car units as possible, which permits the end of the trailer to overhang the next car unit (the trailer king pin is normally located 36 inches back from the front of the trailer). By so doing, the rear platform for carrying the trailer bogie is located ahead of the railway truck at the end of a car. At this location, the trailer bogie platform may be placed at a height below that of the railway truck wheels. In a most preferred construction of the car, the platform is located 26 inches above a rail, which is approximately 16 inches below the deck height of a conventional flatcar. This construction permits a lowered profile for the carried trailers and reduces the air resistance of the car and lading thereby further reducing the consumption of fuel. The lowered height of the trailer also results in a lower overall center of gravity, with resulting improvement in dynamic operating characteristics.

The car units may be of a length which permits only a small gap (approximately 10") to exist between the piggyback shipments thereby further reducing air resistance and resulting in a further fuel savings. This reduced gap between adjacent trailers and containers also tends to reduce pilferage while the shipment is en route, since it is impossible to open the end door and remove lading in such a narrow space.

The length of the overhang beyond a railway truck center at the outer ends of the end car units is minimal and is generally less than half that of the conventional 89-foot flatcar. There is no overhang at the semi-permanent articulated intermediate connections, i.e., the end of the car unit and the center of the articulated connector are at a coincident location. Because of the low overhang at the outer ends of the sections of car units and no overhang at the intermediate connections, the tracking of this railway car assembly has proven to be nearly perfect. Severe lateral motion common to the 89-foot flatcar has been eliminated providing a much smoother ride and reduced damage to the lading. Further, because there is no free longitudinal motion in the articulated connector between the car units, there is practically no opportunity for slack action to occur which can result in lading damage due to the longitudinal impacts resulting from the slack (or train) action. The improved riding qualities of the articulated equipment and the absence of the sever lateral truck movement will also eliminate the air hose separations occasionally experienced at high speeds in the operation of conventional piggy-back flatcar equipment. Additionally, the number of air hose connections will be greatly reduced in a train of this equipment. For example, in a train of ten 10-articulated-car units, there will be only eleven air hose connections between the locomotive, car sections and caboose car. This compares to fifty-one air hose connections in a train of conventional 89-foot piggyback equipment having the ability to also carry one hundred trailers (the latter in 40' lengths on conventional equipment).

Additional objects and advantages of the invention can be seen from the following detailed description thereof with particular reference being had to the accompanying drawings.

BRIEF DESCRIPTION OF THE DRAWINGS

FIG. 1 illustrates in side elevational view a railway car assembly incorporating individual car units constructed in accordance with the present invention.

FIG. 2 illustrates in top plan view one of the end cars illustrated in FIG. 1.

FIG. 3 illustrates in top plan view one of the intermediate cars illustrated in FIG. 1.

FIG. 4 illustrates in top plan view a railway truck which bridges and supports adjacent ends of two cars connected with an articulated connector.

FIG. 9 illustrates in side elevational view an end section of one of the outer cars illustrated in FIG. 1.

FIG. 10 illustrates a sectional view taken along the line A,A' in FIG. 7.

FIG. 11 is a sectional view taken along the lines C,C' of FIG. 7.

FIG. 12 is a sectional view taken along the lines B,B' of FIG. 7.

FIG. 13 is a sectional view taken along the line D,D' of FIG. 7.

FIG. 14 is a sectional view taken along the lines E,E' of FIG. 6.

FIG. 15 is a sectional view taken along the lines F,F' of FIG. 6.

FIG. 16 is a sectional view taken along the lines G,G' of FIG. 6.

FIG. 17 is a sectional view taken along the lines H,H' of FIG. 4.

FIG. 18 is a sectional view taken along the lines I,I' of FIG. 5, omitting articulated connector for clarity.

FIG. 23 is a sectional view taken along the lines K,K' of FIG. 21.

FIG. 24 is a front elevational view of a railway truck bolster utilized in the present invention.

FIG. 25 is a top plan view of the truck bolster of FIG. 24.

FIG. 26 is a sectional view of the truck bolster taken along the lines L,L' of FIG. 24.

FIG. 27 illustrates in side elevational view a side bearing employed in the present invention.

FIG. 28a and 28b illustrate a multi-car assembly adapted for carrying cargo containers.

FIG. 29 represents a sectional view taken along the lines M,M' of FIG. 5.

DETAILED DESCRIPTION OF THE INVENTION

Figure 5:
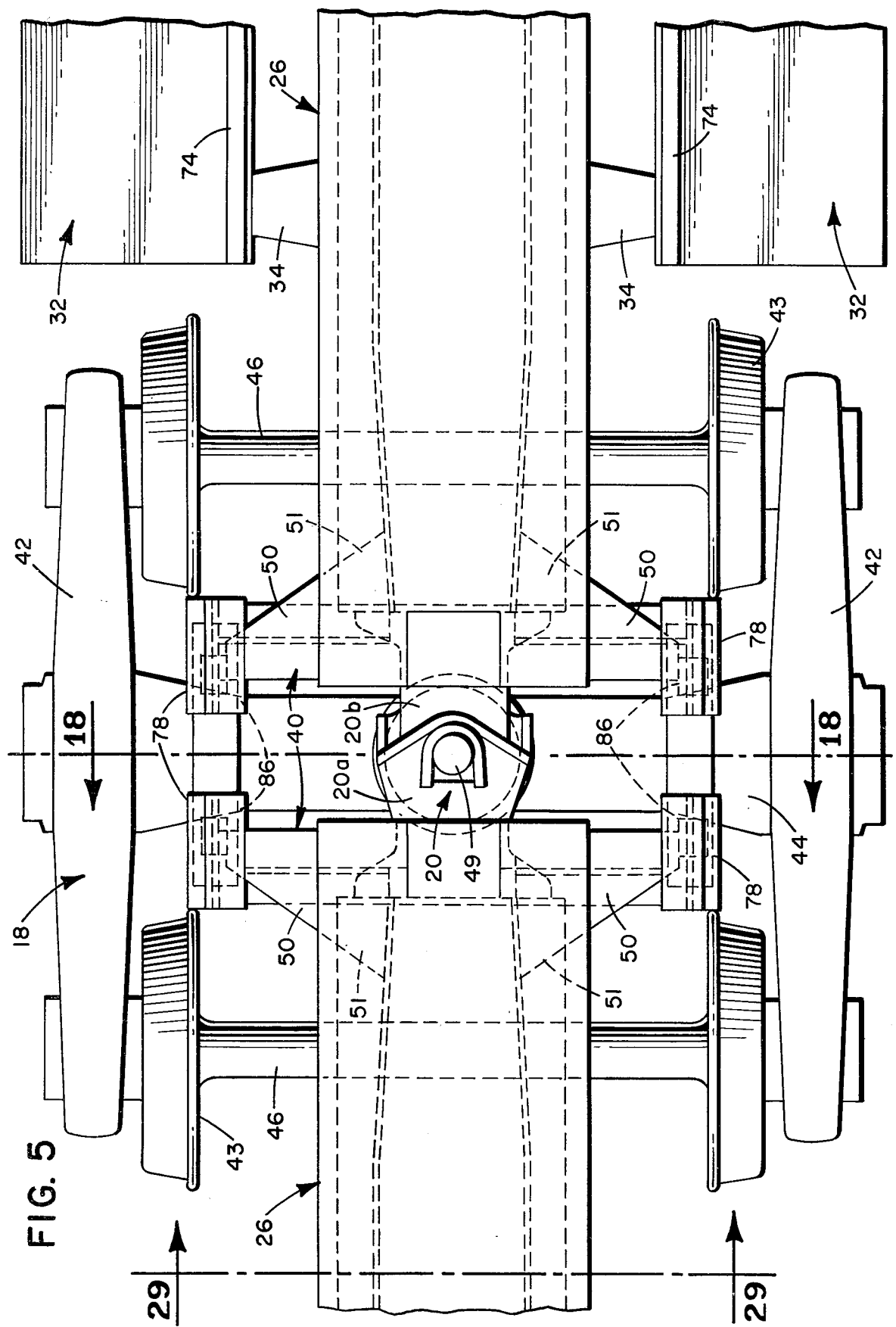
FIG. 5 illustrates in an enlarged top plan view a preferred modification to the structure illustrated in FIG. 4.

A typical railway car assembly 5 of the present invention is illustrated in FIG. 1. A series of individual car units (12, 14 and 16) having a length substantially equal to that of a trailer 21 carried thereon are interconnected via a common truck 18 supporting adjacent ends of contiguous cars. The intermediate cars 12 have, on opposite ends, a male 20b and female 20a portion of an articulated coupling 20 (FIG. 5), while the end cars 14 and 16 have a portion of an articulated coupling at one end and a conventional railway truck 15 supporting a conventional semi-automatic coupler 30 on the other end. The conventional semi-automatic couplers allow the assembly of articulately connected cars to be coupled as a unit with conventional railway equipment, e.g. locomotives or other cars. Similarly, two or more assemblies 5 of articulately connected cars can be coupled together via couplings 30.

Figure 19:
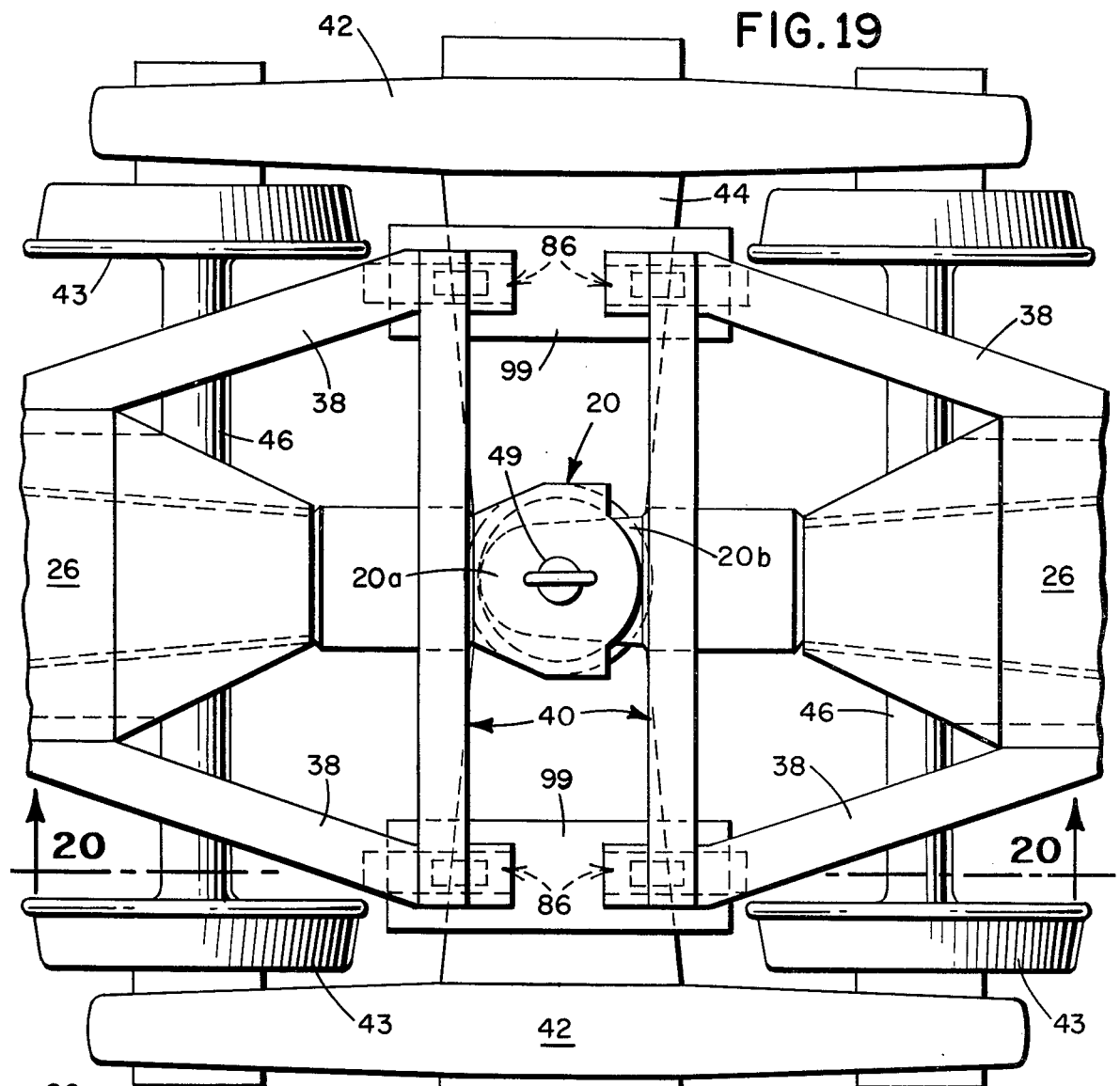
FIG. 19 is a top elevational view of a conventional truck assembly supporting adjacent ends of interconnected cars.
Figure 20:
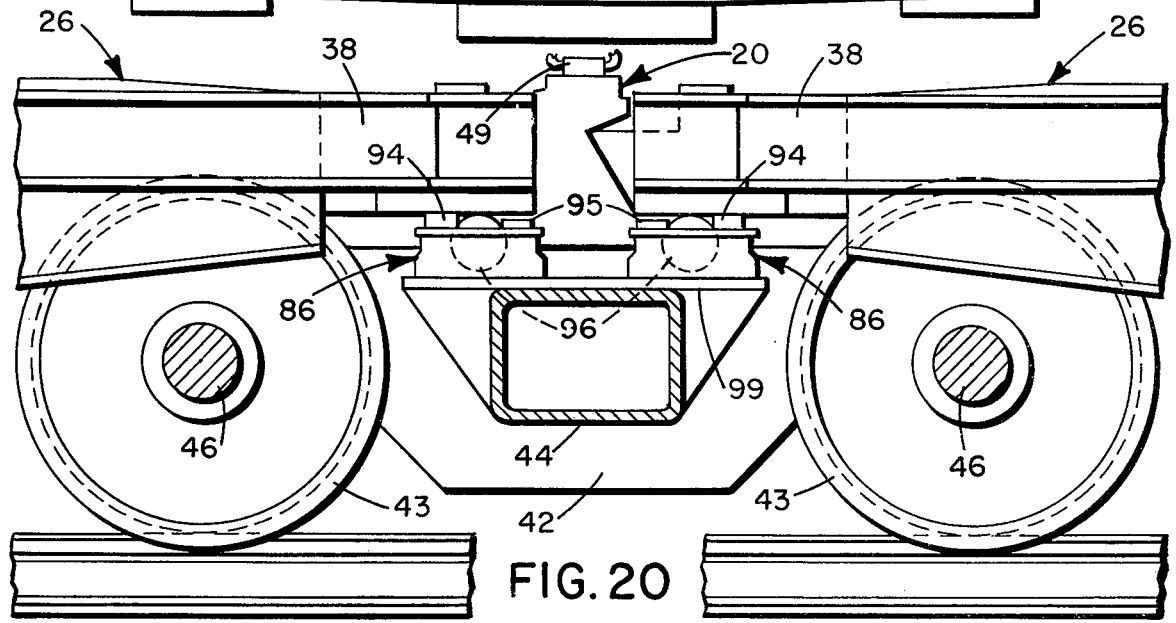
FIG. 20 is a sectional view of the conventional truck assembly taken along the line J,J' of FIG. 19.

Each of the cars is constructed with a center sill 26 (FIGS. 2, 3) extending substantially the entire length of the car. End sills 40 arranged perpendicularly to the center sill are provided at opposite ends of the center sill 26. The end sills 40 have a width exceeding that of the relatively narrow center sill 26 and extend symmetrically beyond it. End sills 40 are interconnected with the center sill 26 by side bearing support members which may take the form of support arms 38, as illustrated in FIGS. 2 through 4 or, preferably, the form of support gussets 50, as illustrated in the FIG. 5 embodiment. The ends of end sills 40 and connected side bearing support members, either arms 38 or gussets 50, are supported on side support bearings 86 which are mounted on a truck bolster 44 (FIGS. 19, 20). When gussets 50 are used as the side bearing support members, additional reinforcement gussets 51 may be added to provide added support for end sill 40, as illustrated in FIG. 29.

Support bearings 86 are more fully illustrated in FIG. 27. They are constructed with a pair of end closures 98 sandwiching a metal roller 96 between resilient elements 94 and 95. The roller 96 is supported on a surface 100 including a flat portion and inclined portions. Resilient element 95 has a height less than that of resilient element 94. Four support bearings 86 are provided on the bolster 44 of each trunk 18 bridging adjacent cars, one pair being provided for each end sill 40 of adjacent cars.

The end sill 40 and its interconnection with the preferred gusset side supports 50 is best illustrated in FIG. 19, which also shows a member 78 connected with support gusset 50. The bottom surface of member 78 rests on a respective support bearing 86.

The railway trucks 18 and 15 are conventional, each incorporating a pair of frames 42 in which are mounted a pair of axles 46 supporting small diameter, i.e., 28", wheels 43. The truck bolster 44 for truck 18, mounted between the frames 42, is provided with a bearing support configured as bolster extension 92 (FIGS. 24-26) which are either cast integral with bolster 44 or welded thereto. The extensions 92 serve as a mounting for respective side bearings 86. A rectangular plate 99 (FIG. 20) mounted on and extending outwardly of the bolster 44 may also be used to support the bearings 86.

Figure 8:
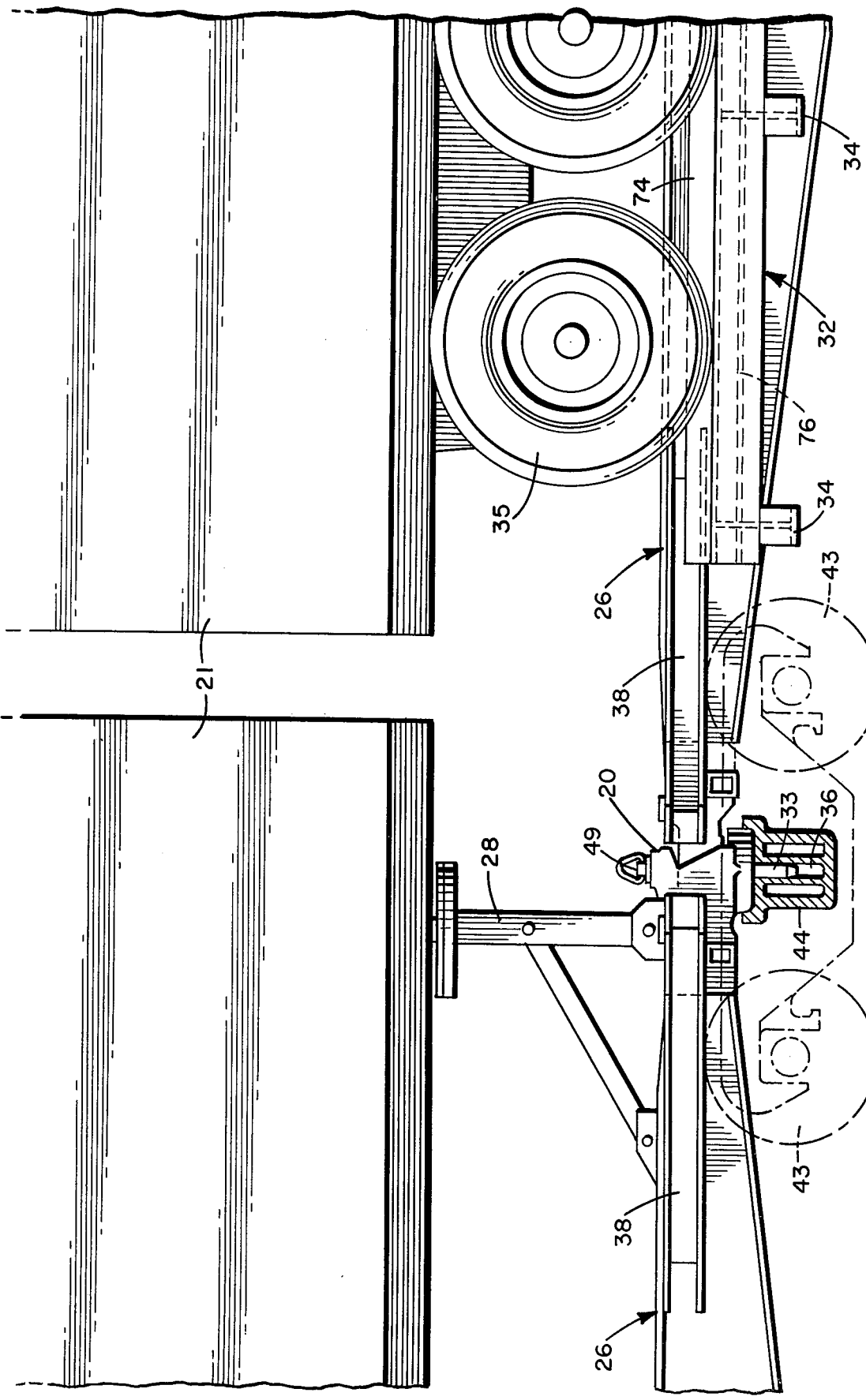
FIG. 8 illustrates in side elevational view the coupling of two intermediate car units together.

The articulated connector 20 is of conventional design and is illustrated in more detail in U.S. Pat. No. 3,646,604. A female portion of this coupling 20a is provided at one end of each interior car 12 while a male portion of the coupling 20b is provided at the other end. Pin 49 locks the male and female portions together. The female portion 20a of each articulated connector 20 is attached with a male connector 33 (FIG. 8) adapted to engage with a complementary female connector 35 provided on the bolster 44 of truck 18. Thus, truck bolster 44 carries four side bearings 86, the articulated coupling 20 and spans, as illustrated in FIGS. 4, 5 and 8, adjacent ends of interconnected cars 12.

Figure 6:
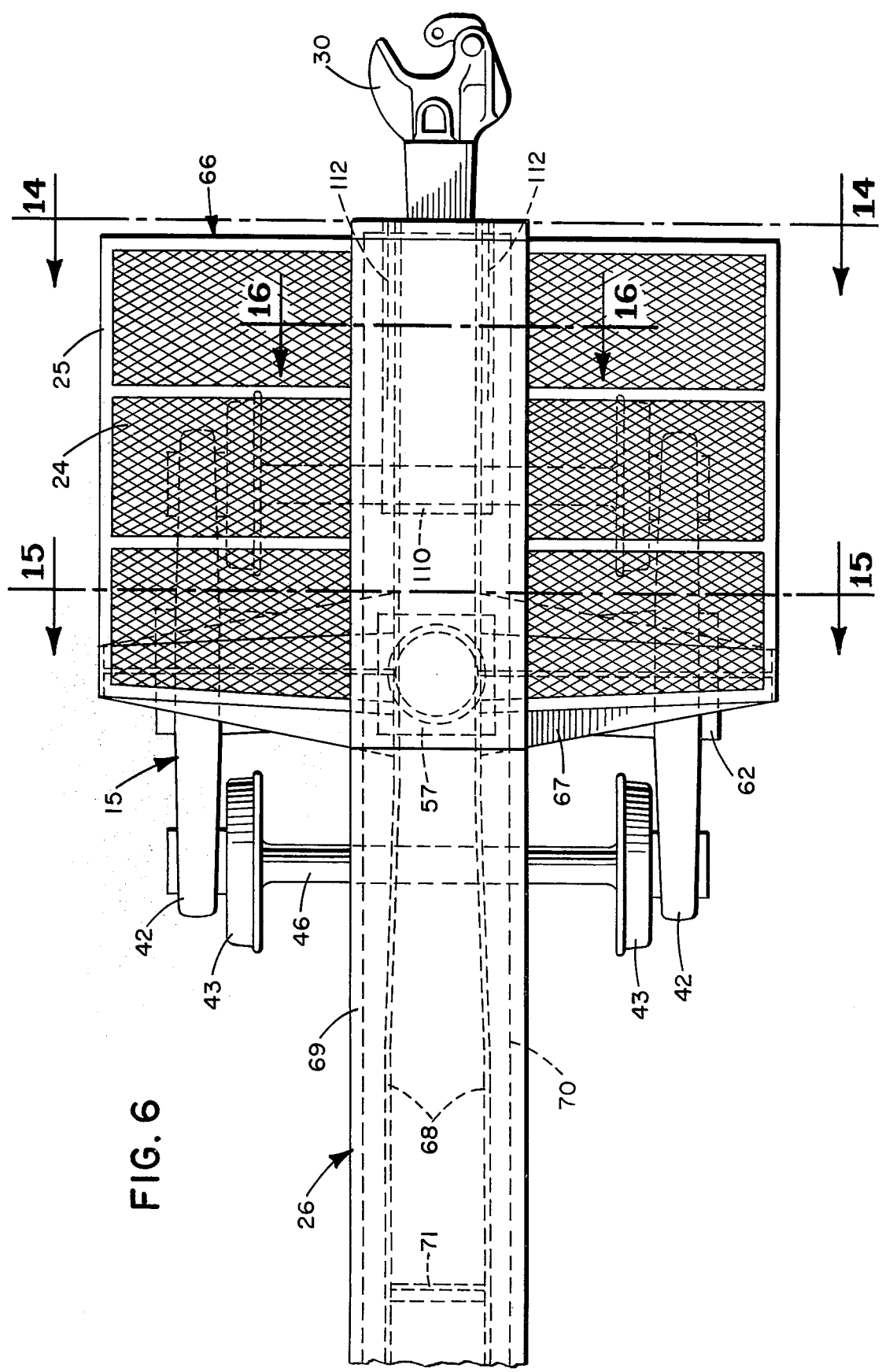
FIG. 6 illustrates in top plan view the end of one of the end cars illustrated in FIG. 1.
Figure 7:
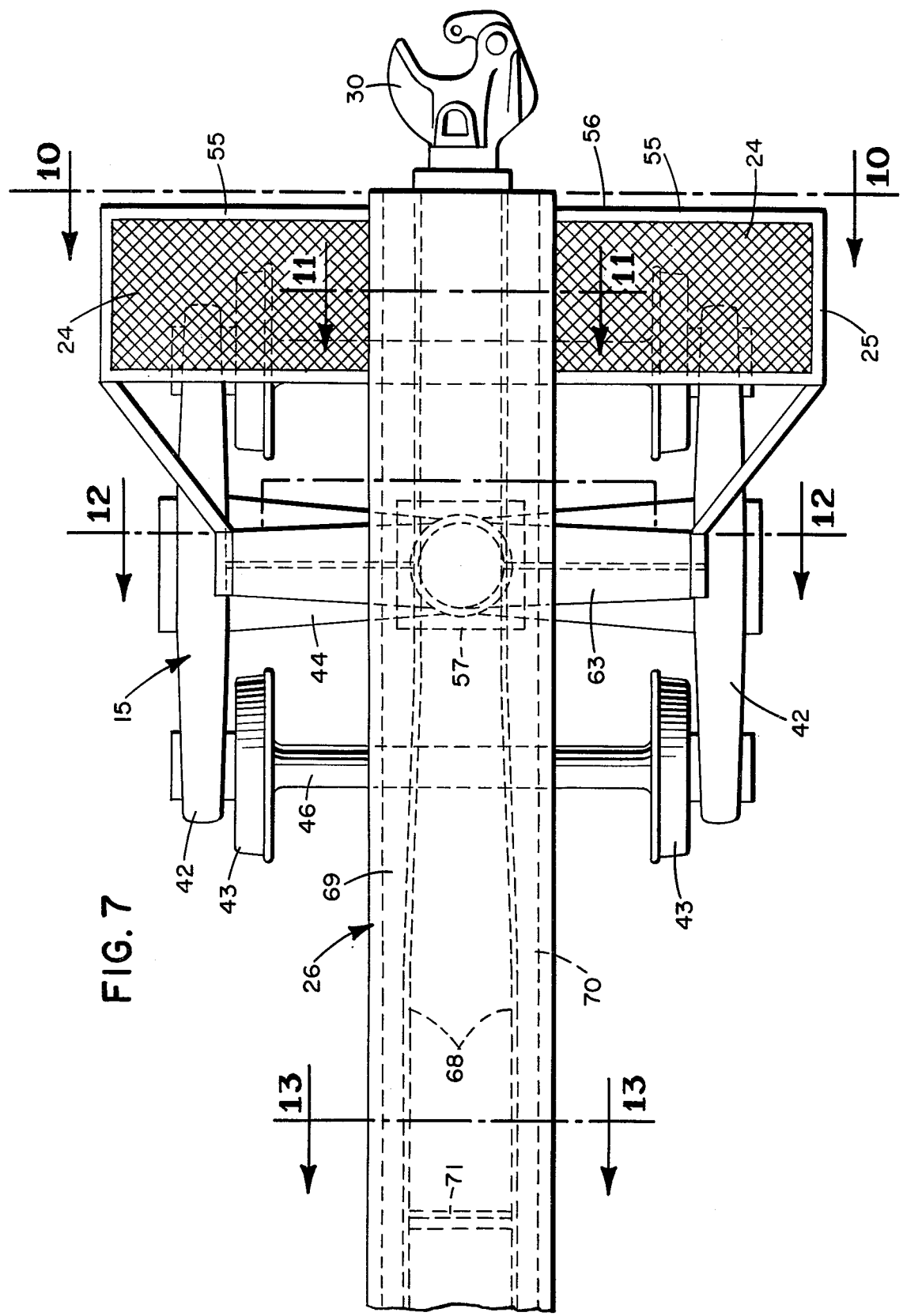
FIG. 7 illustrates in top plan view a preferred modification of the structure illustrated in FIG. 6.

The ends cars (14 and 16) and associated trucks 15 are best illustrated in FIGS. 6 and 7, which represent alternative embodiments. Each end car is provided with a conventional semi-automatic coupler 30 and a truck carrying a body bolster 62 between frames 42 for supporting the center sill 26. A safety platform 24 supported by a frame 25 is also provided. FIG. 6 employs a body bolster 67 which spans the width of truck 15 and a full safety platform 24, which the alternate construction of FIG. 7 employs a narrower body bolster 63 and reduced size safety platform.

As illustrated in FIG. 14, which is an end view of the center sill 26 and safey platform 24 of FIG. 6, safety platform 24 includes an end sill 66 having arms which are connected with center sill 26 and depend outwardly therefrom. Similarly, the corresponding view for the safety platform 24 of FIG. 7 is FIG. 10 which illustrates an end sill 56 and associated arms 57. In the preferred constructions of FIGS. 7 and 10, end sill 56 is constructed with a pair of channels 58 therein which allow passage of an air train line and other components (not shown) therethrough.

FIG. 15 illustrates in sectional view the FIG. 6 body bolster 67 which forms another element of the safety platform frame 25 and which serves to strengthen and stabilize the end of the outer car. FIG. 12 illustrates the preferred FIG. 7 body bolster 63 which, as noted, is shorter than body bolster 67. The shortened bolster 63 and smaller safety platform 24 illustrated in FIG. 7 achieve further weight reductions over the FIG. 6 construction.

Figure 22:
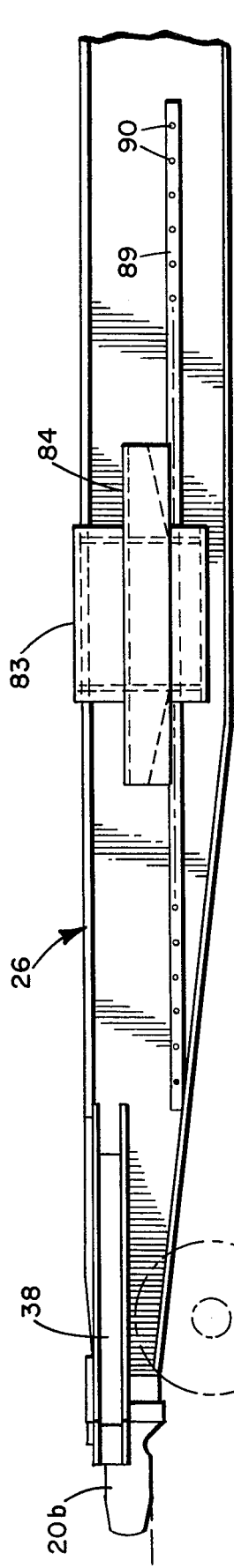
FIG. 22 is a side elevational view of the adjustable trailer bogie support.

The center sill 26 is essentially constructed as a box section (FIG. 13) having a fish-belly shape and cross-sectional which is shallow at the ends of a car and deeper at its center, as illustrated in FIGS. 8, 9 and 22. A top cover plate 69 is provided along with web plates 68 and a bottom cover plate 70.

The conventional semi-automatic coupler 30 used on the end cars may be provided with conventional shock absorbing or cushioning devices 54 (FIG. 6) such as hydraulic cylinders or draft gears fitted into the center sill 26. FIG. 16 illustrates a suitable center sill interior construction for housing a hydraulic cushioning device, while FIG. 11 shows the same view when the center sill is fitted with draft lugs 60 for a draft gear assembly (not shown).

Thus far the construction of the individual cars (12,14, 16) has been described without reference to any particular environment of use. The ensuing discussion will focus on specific construction details which enable the cars to function in a TOFC or COFC environment.

Referring first to the TOFC environment, the cars are provided with a trailer hitch 28 mounted on one end of the center sill 26 and a trailer loading platform or bogie support 32 attached to the other end of the center sill 26 via cross bearers 34. The trailer hitch 28 is provided very near the end of the car and is substantially over the articulated connector 20. With this arrangement of the trailer hitch 28, the bogie platform can be located ahead of the wheels 43 of the truck 18 permitting platform 32 to be lowered a substantial amount. Typically, the top surface of platform 32 is lower than the wheels 43 of truck 18 (FIG. 8) with the trailer wheels 35 being several inches below the top of the center sill 26. The trailer wheels 35 ride 26" above a rail. This in conjunction with the small diameter height car truck wheels 43, permits an overall reduction in the height of the trailers from the ground thereby improving the center of gravity for the loaded cars and lowering the overall wind resistance.

The attachment of the trailer load platform 32 to the center sill 26 is best illustrated in FIG. 17. Cross bearers 34 supporting platform 32 are connected with the center sill 26. Diaphragms 71, mounted within the center sill 26, provide added support where the cross bearers 34 are attached to the center sill. A rub rail 74 is provided on the upper surface of the load platform 32 for guiding the tires 35 of a trailer 21, while support channels 76 extend the length of the load platform 32 to provide additional support thereto.

As shown in FIG. 8, the provision of a trailer hitch 28 substantially over the articulated connector 20 allows for the positioning of a trailer 21 on a car 12 such that its front face overlaps the adjacent car and is in substantial abutment with the rear face of a trailer 21 mounted on the adjacent car. Typically, the gap between adjacent trailers is 10" which is insufficient room for the opening of the rear doors of a trailer. This presents a significant deterrent to the pilferage of the lading. The close compacting of the trailers also reduces wind resistance, thus further contributing to the economics of operating the railroad car assembly. Still further, the weight of the trailer is concentrated on the track 18 which allows the cars 12 to be constructed with the basic shape described above.

FIG. 9 shows the trailer hitch 28 for the end car 14 positioned so that a trailer 21 does not extend over the semi-automatic coupler 30 thereby preventing any interference with subsequent railway cars connected thereto.

As seen in FIGS. 1 through 3 and 8 the individual cars 12 have a length substantially equal to the length of the trailers 12. Cars can be constructed of lengths suitable for trailers currently in use, e.g., slightly more than forty or forty-five feet, or for other unconventional or yet to be devised trailer lengths. Cars of different lengths can be conveniently mixed within the same railway car assembly 5 as needed.

Figure 21:
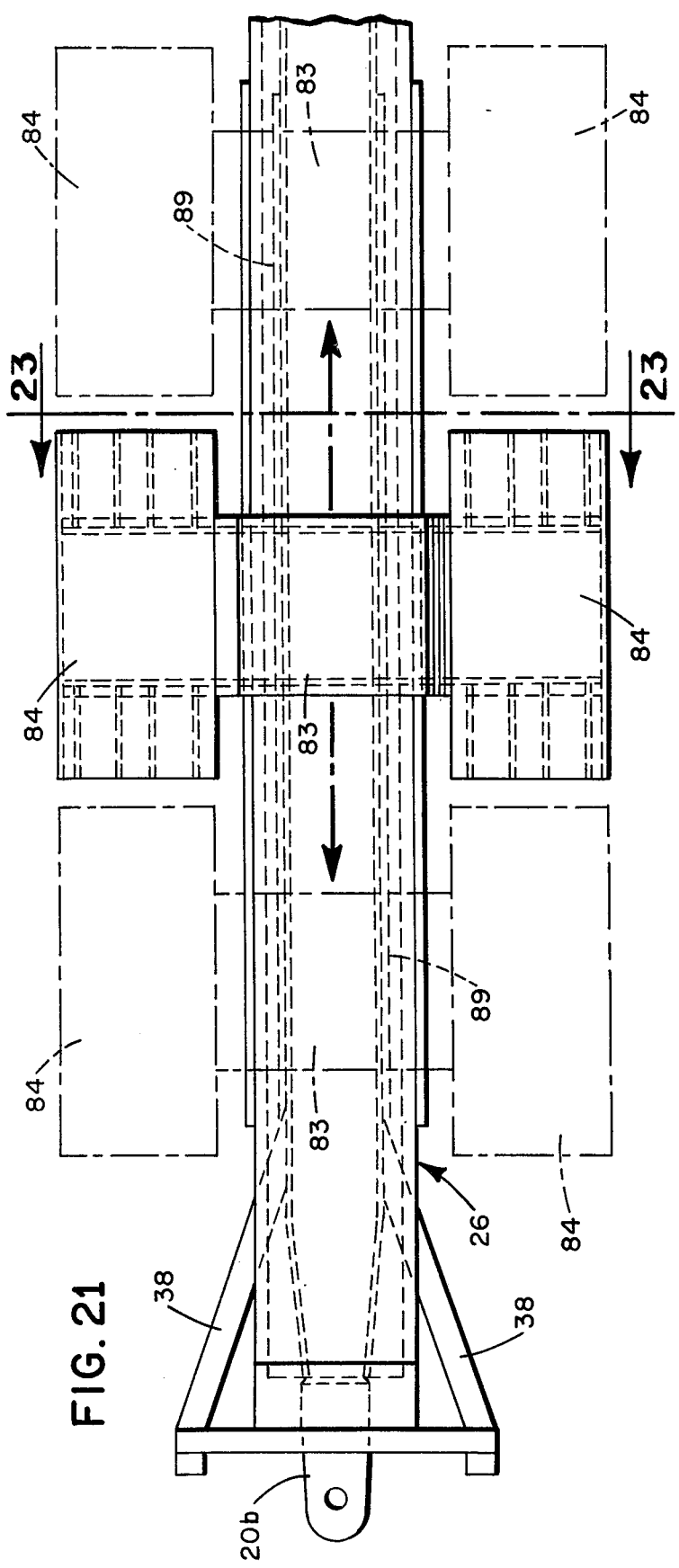
FIG. 21 is a top plan view of an adjustable trailer bogie support used in one embodiment of the invention.

FIGS. 21 through 23 illustrate a modification to the fixed bogie support platform 32. In this embodiment, the bogie platform is adjustable and is attached to a saddle 83 which rides over center sill 26. Adjustable platform 84 can be longitudinally moved along the center sill 26 and guide rails 89 provided on webs 68 and allows the accommodation of different sized trailers on the cars. Adjustment pins or bolts 82 cooperate with apertures 90 in center sill 26 (FIG. 22) to fix the adjustable platform 84 in place once a desired position is established.

FIG. 28 illustrates a car constructed in accordance with the present invention but adapted to handle containerized cargo, i.e., COFC. Support gussets 50 connected between center sill 26 and the end sills 40 function to support the containers. Additional cargo bolsters 101 may be provided along the length of the center sill 26 as needed. When the cars are used in a COFC environment, there is no extension of the containerized cargo over the articulated connector 20, as was true of the TOFC environment. However, the containers are still relatively close together, typically being separated by a distance of 10 to 12 inches.

As indicated above, all of the wheels utilized in the trucks 15 and 18 of the above described railway car assembly are of the so-called low deck variety, i.e., 28" in diameter. These wheels further reduce the overall weight of the railway car assembly while reducing its height and wind resistance.

The typical sequence of constructing the cars making up the articulated railway car assembly will now be described.

The top cover plate 66 of the center sill is placed on a jig (or bed) and the web plates 68 are welded longitudinally to it. The web plates 68 have been previously cut with the fish-belly shape shown in FIGS. 8, 9 and 22, i.e., they have a substantially straight profile along an upper edge, a full depth through a center section with the profile of the bottom edge tapering to a lesser depth near their ends where they flatten out over the truck area.

After the webs 68 have been welded in position, cross bearer support diaphragms 71 are welded transversely between the web plates at locations where the cross bearers 32 will be welded to the webs 68. Slots in the center sill webs for brake levers, the hand brake, or other railroad car equipment, are next cut into the web 68 and these holes or slots are lined with reinforcement plates welded into the contour of the slot. Thereafter, the bottom cover plate 70 (FIG. 13) which has been previously bent to the contour of the bottom profile of the web plates, is welded thereto to complete the center sill section 26.

On the end car units, a heavy diaphragm (not shown) is welded traversely between the web plates 68 as reinforcement at the body bolster (63, FIG. 7; 67, FIG. 6) location prior to the application of the bottom cover plate. Longitudinal sections (not shown) may be welded to the heavy diaphragm to form a reinforcement spider for the male body center plate 57 (FIGS. 6 and 7). Draft lugs 60 (FIG. 11) are also welded into the outer end of the center sill at this time, assuming a draft gear will be used in conjunction with a coupler 30.

The articulated connectors are next welded into the ends of the center sill 26 with several welding passes around the sill. The end sills 40 are next applied, together with the longitudinal bracings (either gussets 50 and 51 or support arms 38). The bogie platforms 32 are applied to the center sill 26 at the same time. Bogie platforms 32 have been previously assembled with two longitudinal channel reinforcements 76 being coped into the cross bearers 34 prior to the cover or deck plate 32 being applied. The tire rub rails 74 are also applied to the deck plate at this time. The whole assembly is attached to the center sill by welding the cross-bearer assembly to the center sill at the points where the reinforcing diaphragms 71 are located within the center sill 26.

Brackets (not shown) are next applied for mounting the usual hand brake, air brake valves, air reservoirs, air train lines, etc. which are conventionally used in railway equipment. These items (not illustrated) are then mounted on the car and the end car receives its safety crossover platform 24 constructed in the manner illustrated in either FIGS. 6 or 7. The car is then mounted on the previously assembled 28-inch diameter wheel freight car trucks 15 or 18 and the trailer hitch 28 is applied, the brake lines connected to the air equipment, and the air hose connections applied to complete the assembly. The completed car is then painted and stenciled.

Tests have been conducted on the articulated railway car assembly described. On curves of up to 16° of curvature and under conditions of heavy buff and pull forces, the cars did not exhibit any tendency to jack-knife or pull off the curve which is typically experienced in the operation of conventional 89-foot piggyback equipment. The improved riding qualities are attributed to the fact that the trucks are located at the very ends of short cars. Additionally, because the pivot point of the coupling is at the extreme ends of the cars, the tendency of the cars to jack-knife in a compression situation is greatly reduced over the conventional piggyback equipment where the bolster pivot point is some distance back from the coupling point.

A railway car assembly constructed in accordance with the teachings of the invention typically achieves a 625-ton reduction in the weight of a train capable of handling 100 trailers, i.e., from 3,800 tons for conventional 89-foot piggyback carriers to 3,175 tons for the articulated car train described above. This weight reduction is significant, achieving significant decreases in fuel consumption and locomotive requirements.

Although the above discussion has been directed towards the use of the light weight articulated cars in connection with piggyback service (either TOFC or COFC), it should be apparent that the same concept can be employed in equipment for the handling of almost any type of commodity. Moreover, additional modifications to the described structures will be readily apparent to one of ordinary skill in the art. Accordingly, all embodiments described are exemplary and the present invention limited solely by the scope of the claims appended hereto.

What is claimed is:

1. A railway car comprising at least two railway car units connected end to end by an articulated connector having mating male and female members, said ends of said car units being mounted on a single truck assembly which spans the space between said ends, each of said car units comprising a center sill which extends substantially the entire length of the car unit, a first of said mating members of said articulated connector fixed to one of said car units and a second of said mating members fixed to a second of said car units, an end sill disposed transversely on each of said car units and extending substantially symmetrically from the center sill, a side bearing support member extending from respective sides of the center sill at points spaced from the said end of each car unit and extending longitudinally between car units, said single truck assembly comprising a pair of side frames holding a pair of axles having wheels mounted thereon, a truck bolster disposed between and extending substantially parallel to said axles for supporting said articulated connector, a side bearing support member on said bolster on opposite sides of the longitudinal axis of the bolster, and one pair of side bearings disposed on each of said bearing support members, each pair of side bearings on the same side of said longitudinal axis of the bolster supporting said pair of side bearing support members of one of said interconnected car units.

2. The railway car of claim 1 wherein the car units have only a short platform on each side of the center sill for supporting cargo thereby eliminating heavy underframe support.

3. The railway car of claim 1 wherein the car units have a skeleton structure.

4. The railway car of claim 3 wherein at least one car unit is adapted to carry a trailer of a highway tractor-trailer rig and has a platform disposed at a height below that of the railway truck wheels whereby the carried trailer has a low profile and offers reduced air resistance with accompanying reduction in fuel consumption.

5. The railway car of claim 3 wherein the lengths of the car units are coordinated with the length of the cargo whereby the gap between cargoes on adjacent car units is small and air resistance is reduced.

6. A railway car comprising a series of railway car units connected end to end by articulated connectors having male and female mating members, a single railway truck assembly which spans the space between adjacent car unit ends with adjacent ends of said railway car units mounted thereon, each of said car units being of a length approximately equal to that of a cargo trailer to be carried thereby and comprising a center sill extending substantially the entire length of the car unit, one mating member of said articulated connector fixed on one end of each car unit and a second of said mating members fixed to a second car unit, an end sill disposed transversely on each car unit and extending symmetrically beyond the width of said center sill, a pair of side bearing support members extending from respective sides of said center sill at a point spaced from said one end to respective ends of said end sill and extending longitudinally between car units, and a railway truck coupled to the other end of said center sill, said single railway truck assembly comprising a pair of side frames holding a pair of axles having wheels mounted thereon, a truck bolster disposed between and extending substantially parallel to said axles for supporting said articulated connector, a side bearing support member on said bolster on opposite sides of the longitudinal axis of said bolster, and side bearings disposed on each of the side bearing support members, each side bearing on the same side of said longitudinal axis supporting said pair of side bearing support members of one of said interconnected car units, said car unit having only a short platform on each side of said center sill at one end adjacent and offset from the wheels of said truck assembly to support wheels of a cargo trailer at a height approximately the same as that of said truck assembly wheels, and a trailer hitch mounted on said center sill substantially over the articulated connector whereby the weight of the cargo trailer is supported by opposite ends of the car unit adjacent the railway trucks and the front of a trailer may extend beyond said trailer hitch to a position to minimize the gap with the rear of a trailer on a preceding car unit.

7. A railway car comprising at least two railway car units mounted on a single railway truck assembly which spans the gap between car units, said car units being connected together by an articulated connector having mating members and mounted on said single truck assembly, each said car unit comprising a center sill extending substantially the entire length of said car unit, each said center sill also comprising a pair of platforms, one connected to each side of said center sill located substantially lower than the top of said center sill and positioned between railway truck assemblies at a height below the height of the railway truck wheels, and a trailer hitch disposed at a location on said center sill of each unit of said car assembly near the centerline of the said articulated connector, one mating member of said articulated connector fixed on one end of one of said car units and a second mating member disposed fixed to a second of said car unit ends, an end sill disposed transversely on each of the car units and extending symmetrically of said center sill, a pair of side bearing support members extending from respective sides of said center sill at a point parallel with said center sill and dimensionally compatible with said truck assembly side bearing supports on a truck bolster, each pair of side bearing support members on each car unit of said railway car assembly being directly opposed in a horizontal and vertical plane of alignment, said single railway truck assembly comprising a pair of side frames holding a pair of axles having wheels mounted thereon, a truck bolster disposed between and extending longitudinally substantially parallel to said axles for supporting said articulated connector, a side bearing support disposed on said bolster, and two pairs of side bearings with one pair disposed on each said bearing support on opposite sides of the longitudinal axis of said bolster, each pair of side bearings on the same side of said longitudinal axis supporting said pair of side bearing support members of one of said interconnected units, said car units each having only short platforms on each side of the center sill as the deck of the said unit.

8. The railway car of claim 1, 6 or 7 wherein said truck bolster comprises extensions for mounting said side bearings.

9. The railway car of claim 1, 6 or 7, wherein said side bearing support members are symmetrical on each side of the center-line of the said articulated connector.

10. The railway car of claim 1, 6 or 7, wherein each of said side bearings comprises a housing, a pair of resilient elements mounted in said housing, said resilient elements being of different heights, and a roller positioned between said resilient elements.

11. The railway car of claim 1, 6, or 7, wherein one end of said car units carries a male member of said articulated connector and the other end carries a female member.

12. The railway car of claim 1, or 7, wherein car units are interconnected with one another by a series of said articulated connectors and associated single truck assemblies and wherein the end car units of said series have at their outermost ends railway trucks and semi-automatic coupling members and the interior car units of said series have on opposite ends complementary portions of said articulated connector.

13. The railway car of claim 12 wherein two to twelve car units are provided in said series.

14. The railway car of claim 12 adapted to carry a cargo container.

15. The railway car of claim 14 wherein the container is refrigerated.

16. A railway car as in claim 12 wherein each of said car units is adapted to carry a trailer of a tractor-trailer rig and the length of each car unit substantially equals the length of said carried trailer.

17. The railway car of claim 16 wherein at least one of said car units is adapted to carry a container on said center sill and support bolsters.

18. The railway car of claim 17 wherein at least one car unit comprises load supporting bolsters extending outwardly of said center sill.

19. The railway car of claim 16 wherein the the trailer is refrigerated.

20. The railway car of claim 16 wherein the said car units have only a partial deck and are adapted to carry a trailer, and further comprise a platform mounted on said center sills near one end thereof for carrying a trailer bogie, and a trailer hitch mounted on the other end of said center sill at a position over said common truck assembly, said trailer hitch being positioned such that the front of a trailer mounted on said car units projects over said articulated connector and a portion of the next connected unit.

21. The railway car of claim 16 or 19 wherein end units comprise end of car cushioning members for said semi-automatic coupling members.

22. The railway car of claim 21 wherein said cushioning members are hydraulic cushioning devices.

23. The railway car of claim 21 wherein said cushioning members are draft gears.

24. The railway car of claim 21 wherein said platform has a top surface upon which a trailer bogie rests, said surface being below the level of the top-most portion of the wheels of said single truck assembly.

25. The railway car of claim 24 wherein said wheels are substantially 28 inches in diameter.

26. The railway car of claim 24 or 25 wherein said platform is provided on a longitudinally adjustable saddle which is adapted to move along said center sill.

* * * * *